J. J. BOWES, Jr.
GEARING.
APPLICATION FILED FEB. 15, 1908.
No. 904,931.
Patented Nov. 24, 1908.
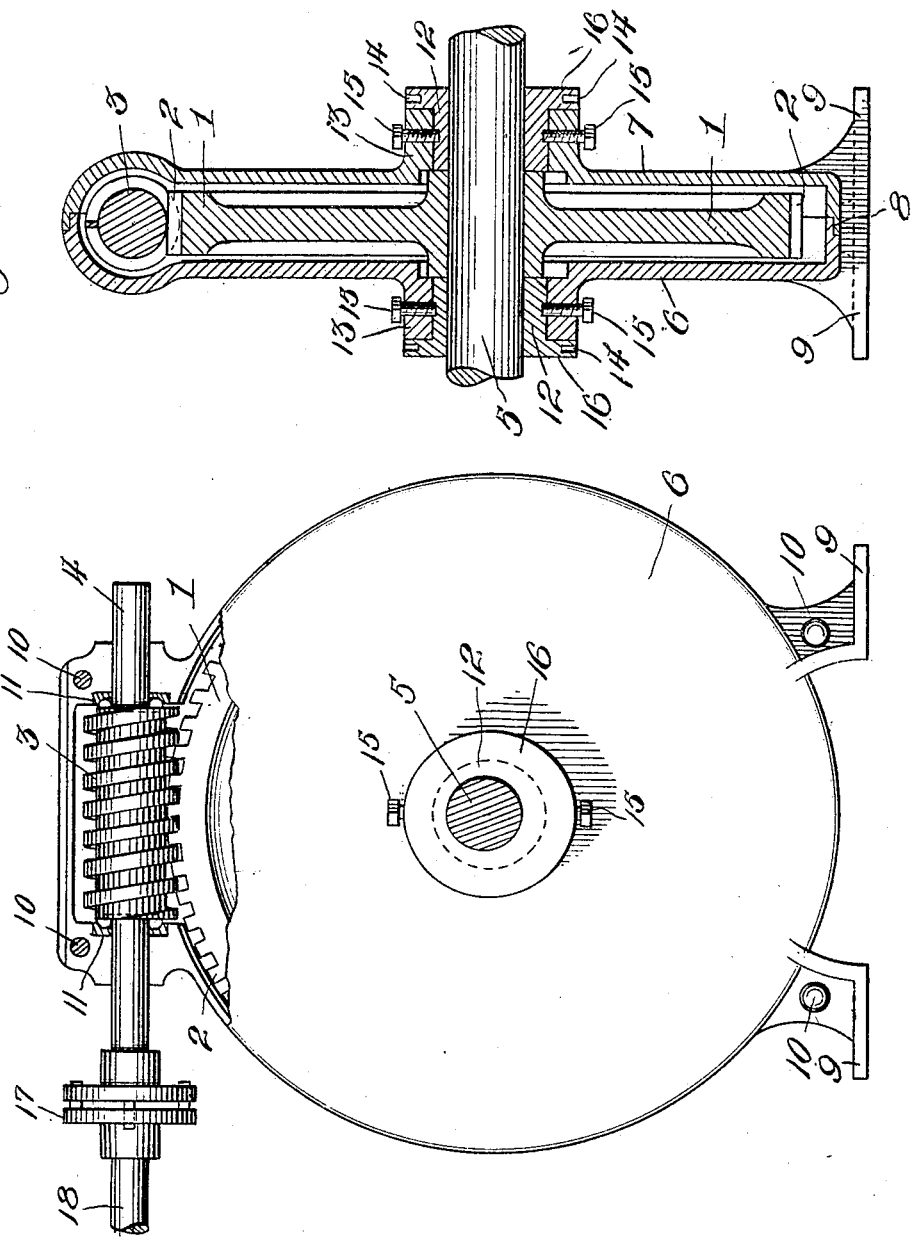
Witnesses
J. T. L. Wright
P. M. Smith
Inventor
John J. Bowes, Jr.
By Victor J. Evans
Attorney

UNITED STATES PATENT OFFICE.

JOHN J. BOWES, JR., OF PENSACOLA, FLORIDA.

GEARING.

No. 904,931.  Specification of Letters Patent.  Patented Nov. 24, 1908.

Application filed February 15, 1908. Serial No. 416,101.

*To all whom it may concern:*

Be it known that I, JOHN J. BOWES, Jr., a citizen of the United States, residing at Pensacola, in the county of Escambia and State of Florida, have invented new and useful Improvements in Gearing, of which the following is a specification.

This invention relates to gearing for mechanical movements, the object of the invention being to provide a power transmission device in which the power of one shaft is transmitted to another shaft exactly at right angles thereto without the aid of the usual bevel gearing.

The main object of the present invention is to provide in connection with a suitable gear case, intermeshing worm gears mounted therein so that dirt, dust and other foreign matter is effectively excluded therefrom and means for adjusting the gears relatively to each other from the outside of the gear case and without opening up the gear case, whereby said gears are maintained in proper working mesh with each other and wear may be taken up.

With the above and other objects in view, the nature of which will more fully appear as the description proceeds, the invention consists in the novel construction, combination and arrangement of parts as herein fully described, illustrated and claimed.

In the accompanying drawings:—Figure 1 is a broken side elevation of the gearing of this invention. Fig. 2 is a diametrical section through the same.

Referring to the drawings, 1 designates a worm wheel provided with peripheral worm teeth 2 while 3 designates a worm mounted fast on a driving shaft 4 which extends at right angles to the shaft 5 of the worm wheel 1 said wheel being also fast on said shaft.

In carrying out the present invention, I provide a two-part or sectional gear case embodying the oppositely arranged similar sections 6 and 7, each circular in form, the two sections having an overlapping rabbeted engagement along their peripheries as shown at 8 whereby all dirt, dust or foreign matter is effectually excluded. The sections are further provided with attaching and supporting feet or flanges 9 adapted to be secured to a floor or other support, while the two parts or sections of the casing are secured firmly together by fasteners 10 in the form of bolts, rivets or the like.

The opposite ends of the worm 3 are provided with annular ball races in which are mounted series of inlet friction balls 11 which also run in annular grooves in the upper portion of the gear case, the said balls constituting end thrust bearings for the worm, being interposed between the opposite ends of the worm and the adjacent walls of the gear, both as clearly shown in Fig. 1.

The shaft 5 of the worm wheel 1 is journaled in eccentric bushings 12 mounted in the opposite gear case sections as shown in Fig. 2, the said sections being enlarged or provided with laterally projecting hubs 13 in which the said bushings 12 are mounted. The bearing openings in said bushings are eccentric relatively to the outer surfaces of the bushings so that by turning the bushings 12 within the sections of the gear case, the worm wheel 1 is moved toward or away from the worm 3 in order to obtain the proper mesh for operative engagement between said parts. In order to turn the bushings 12, they may be provided with spanner sockets 14 adapting them to be turned by means of a suitable spanner, and after the desired adjustment is effected, the bushings 12 may be held by one or more set screws 15. Under the preferred embodiment of the invention, the bushings 12 are provided at their outer ends with circumferential flanges 16 in which the spanner sockets 14 are formed, said flanges lying in close proximity to or against the opposite outer edges of the hub extensions 13 of the gear case.

17 designates a coupling by means of which the shaft 4 of the worm may be connected to an extension shaft 18.

From the foregoing description, it will be seen that the worm wheel 1 may be adjusted toward and away from the worm 3 from the exterior of the gear case and without opening up the gear case, the interior of which may thus be kept perfectly free from dust, dirt and any other foreign matter.

Having thus described the invention, what is claimed as new, is:—

1. Gearing of the class described embodying a worm, a worm shaft, a worm wheel, a worm wheel shaft, and a sectional gear case inclosing the said worm and worm wheel and having bearings for the shafts thereof, adjustable eccentric bushings mounted in the gear case and having the worm wheel shaft journaled therein, and means for fastening said eccentric bushings.

2. Gearing of the class described comprising a worm, a worm shaft, a worm wheel, a worm wheel shaft, a sectional gear case the sections of which have a rabbeted engagement at their meeting edges, eccentric bushings mounted in the gear case and having the worm wheel shaft journaled therein, said bushings having flanges thereon provided with spanner sockets whereby said bushings are adapted to be turned to move the worm wheel toward and away from the worm, and means for fastening said bushings.

3. Gearing of the class described comprising a worm, a worm shaft, a worm wheel, a worm wheel shaft, a sectional gear case inclosing the worm and worm wheel and providing bearings for said shafts, means for adjusting the worm wheel toward and away from the worm, and end thrust ball bearings for the worm consisting of circular series of anti-friction balls mounted in ball races formed in the opposite ends of the worm and the opposing walls of the gear case, substantially as described.

In testimony whereof I affix my signature in presence of two witnesses.

JOHN J. BOWES, Jr.

Witnesses:
W. E. WILSON,
IRVING J. KING.